United States Patent
Neelakantan et al.

(10) Patent No.: US 9,688,257 B2
(45) Date of Patent: Jun. 27, 2017

(54) ELECTRONIC TRANSMISSION RANGE SELECTION SUBSYSTEM IN A HYDRAULIC CONTROL SYSTEM FOR AN AUTOMATIC TRANSMISSION

(71) Applicant: GM Global Technology Operations LLC, Detroit, MI (US)

(72) Inventors: Vijay A. Neelakantan, Rochester Hills, MI (US); Joshua McDonough, Novi, MI (US); Matthew R. Knoth, Indianapolis, IN (US); Philip C Lundberg, Keego Harbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 14/570,329

(22) Filed: Dec. 15, 2014

(65) Prior Publication Data
US 2016/0167635 A1    Jun. 16, 2016

(51) Int. Cl.
*B60T 13/68* (2006.01)
*B60T 13/66* (2006.01)

(52) U.S. Cl.
CPC .......... *B60T 13/686* (2013.01); *B60T 13/662* (2013.01)

(58) Field of Classification Search
CPC ...... B60T 13/686; B60T 13/662; F16H 59/00; F16H 61/66; F16H 61/30; F16H 61/003; F16H 61/0206; F16H 61/12; F16H 61/0021; F16D 25/00
USPC ....................... 74/473.11; 475/116, 119, 127
See application file for complete search history.

(56) References Cited

U.S. PATENT DOCUMENTS

| | | | |
|---|---|---|---|
| 7,270,027 B2 | 9/2007 | Berger et al. | |
| 8,435,148 B2 | 5/2013 | Moorman | |
| 8,894,545 B2 | 11/2014 | Berger | |
| 8,932,167 B2 | 1/2015 | Berger et al. | |
| 2011/0197982 A1* | 8/2011 | Moorman | F16H 61/0031 137/565.11 |
| 2014/0123799 A1 | 5/2014 | Landino et al. | |
| 2014/0360302 A1 | 12/2014 | Lundberg | |
| 2015/0129385 A1* | 5/2015 | Lundberg | F16H 61/0206 192/3.57 |
| 2016/0069451 A1* | 3/2016 | McDonough | F16H 61/0021 74/473.11 |

OTHER PUBLICATIONS

U.S. Appl. No. 14/517,074, filed Oct. 17, 2014, by Philip C. Lundberg et al. All pages.

* cited by examiner

*Primary Examiner* — Melanie Torres Williams

(57) ABSTRACT

A hydraulic control system for a transmission includes a source of pressurized hydraulic fluid, a park servo connected to a park mechanism, the park servo having a park side, an out-of-park side, and a biasing member disposed on the park side. A first valve assembly includes a first inlet port in fluid communication with the source of pressurized hydraulic fluid, a first outlet port, and a first valve for selectively allowing fluid communication between the first inlet port and the first outlet port. A second valve assembly includes a second inlet port in direct fluid communication downstream of the first valve assembly, a second outlet port in direct fluid communication with the out-of-park side of the park servo, and a second valve moveable between an out-of-park position and a park position.

11 Claims, 5 Drawing Sheets

ELECTRONIC TRANSMISSION RANGE SELECTION SUBSYSTEM IN A HYDRAULIC CONTROL SYSTEM FOR AN AUTOMATIC TRANSMISSION

TECHNICAL FIELD

The invention relates to a hydraulic control system for an automatic transmission, and more particularly to an electronic transmission range selection subsystem in a hydraulic control system for an automatic transmission.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

The transmission generally operates in a plurality of modes of operation including out-of-Park driving modes and a Park mode. The out-of-Park driving modes generally include the forward gear or speed ratios (i.e. a Drive mode), at least one reverse gear or speed ratio (i.e. a Reverse mode), and a Neutral mode. Selection of the various driving modes is typically accomplished by engaging a shift lever or other driver interface device that is connected by a shifting cable or other mechanical connection to the transmission. Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers.

While previous ETRS subsystems are useful for their intended purpose, the need for new and improved hydraulic control system configurations within transmissions which exhibit improved performance, especially from the standpoints of efficiency, responsiveness and smoothness, is essentially constant. These control systems must also meet specific safety requirements for new transmission and vehicle designs during particular failure modes of operation. Accordingly, there is a need for an improved, cost-effective ETRS subsystem within a hydraulic control system for use in a hydraulically actuated automatic transmission.

SUMMARY

A hydraulic control system for a transmission includes a source of pressurized hydraulic fluid, a park servo connected to a park mechanism, the park servo having a park side, an out-of-park side, and a biasing member disposed on the park side. A first valve assembly includes a first inlet port in fluid communication with the source of pressurized hydraulic fluid, a first outlet port, and a first valve for selectively allowing fluid communication between the first inlet port and the first outlet port. A second valve assembly includes a second inlet port in direct fluid communication downstream of the first valve assembly, a second outlet port in direct fluid communication with the out-of-park side of the park servo, and a second valve moveable between an out-of-park position and a park position. The second valve allows fluid communication from the second inlet port to the second outlet port when in the out-of-park position and prohibits fluid communication from the second inlet port to the second outlet port when in the park position.

In one aspect of the present invention, a first solenoid is in selective fluid communication with the first valve assembly to selectively move the first valve, and a second solenoid is in selective fluid communication with the second valve assembly to selectively move the second valve to the out-of-park position.

In another aspect of the present invention, the first solenoid and the second solenoid are normally low.

In another aspect of the present invention, the first solenoid and the second solenoid are normally high.

In another aspect of the present invention, a park inhibit solenoid selectively mechanically engages the park servo.

In another aspect of the present invention, a transmission control module is in electronic communication with the first and second solenoids.

In another aspect of the present invention, the park inhibit solenoid is in electronic communication with a control module, such as an engine control module, body control module, brake control module, or a dedicated park inhibit solenoid module.

In another aspect of the present invention, the second valve assembly further includes a third inlet port in fluid communication with the first outlet port of the first valve assembly and a third outlet port in fluid communication with the park side of the park servo, wherein the second valve prohibits fluid communication between the third inlet port and the third outlet port when in the out-of-park position and allows fluid communication between the third inlet port and the third outlet port when in the park position.

In another aspect of the present invention, a third solenoid and a first check valve are disposed between the third solenoid, the second solenoid, and the second valve assembly.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
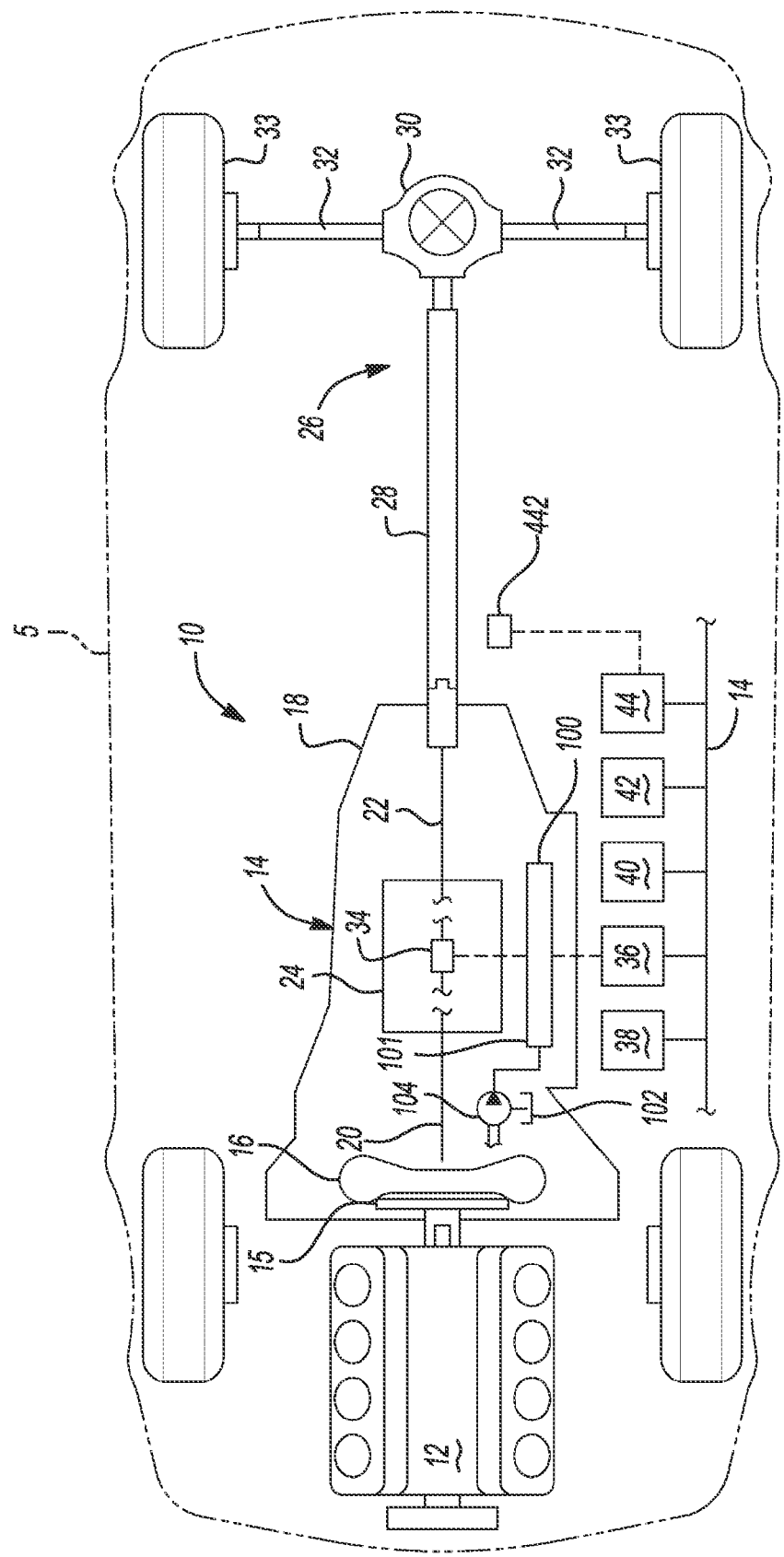
FIG. 1 is a is a schematic diagram of an exemplary powertrain in a motor vehicle.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, hybrid engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed including a dry launch clutch.

The transmission 14 has a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 further includes various control modules used to electrically control the operation of the motor vehicle 5. For example, the motor vehicle 5 includes a transmission control module 36 that controls the transmission 14 through a hydraulic control system 100, an engine control module 38 which controls the operation of the engine 12, an electronic brake control module 40 that controls brake systems in the motor vehicle 5, and a body control module 42 that controls traction control in the motor vehicle 5. In one example, the motor vehicle also includes a park inhibit solenoid assembly (PISA) module 44 that controls operation of a park inhibit solenoid assembly, as will be described below. Each of the modules 36, 38, 40, 42, 44 are electronic control devices having a preprogrammed digital computer or processor, control logic or circuits, memory used to store data, and at least one I/O peripheral. The control logic includes or enables a plurality of logic routines for monitoring, manipulating, and generating data and control signals. Controls signals are communicated through a bus network 44 to each of the modules 36, 38, 40, 42, 44 and to various components within the motor vehicle 5 including the engine 12 and transmission 14. It should be appreciated that to those skilled in the art, the modules 36, 38, 40, 42, 44 are separate and distinct components of the motor vehicle 5 with specific drivers and hardware that perform specific, non-generalized operations.

The transmission control module 36 transmits control signals to the hydraulic control system 100 to initiate various modes of operation. The hydraulic control system 100 is disposed within a valve body 101 that contains and houses via fluid paths and valve bores most of the components of the hydraulic control system 100. These components include, but are not limited to, pressure regulation valves, directional valves, solenoids, etc. The valve body 101 may be attached to a bottom of the transmission housing 18 in rear-wheel drive transmissions or attached to a front of the transmission housing 18 in front-wheel drive transmissions. The hydraulic control system 100 is operable to selectively engage the clutches/brakes 34 and to provide cooling and lubrication to the transmission 14 by selectively communicating a hydraulic fluid from a sump 102 under pressure from either an engine driven pump 104 or an accumulator (not shown). The pump 104 may be driven by the engine 12 or by an auxiliary engine or electric motor.

Figure 2:
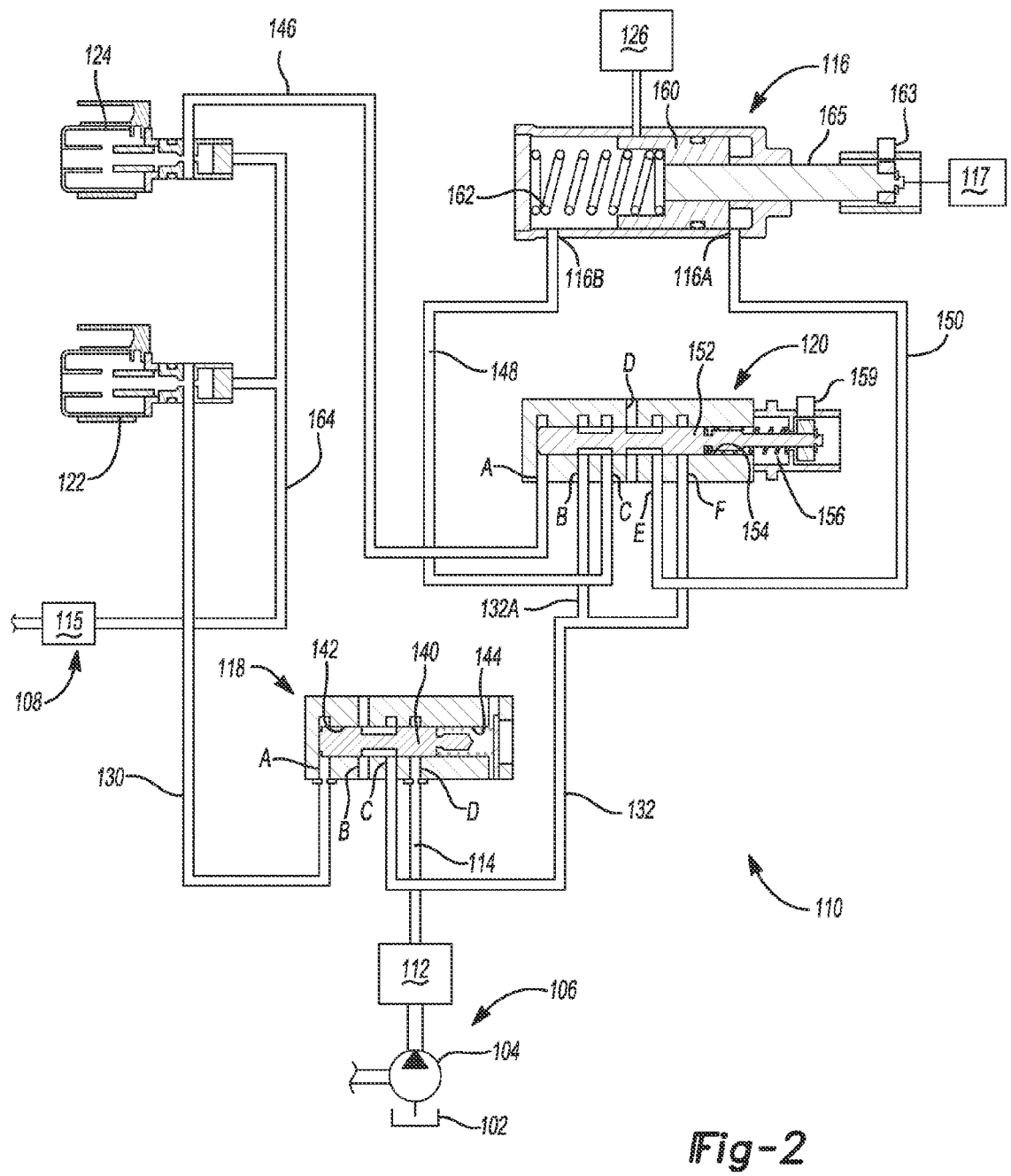
FIG. 2 is a diagram of a portion of a hydraulic control system according to the principles of the present invention.

Turning to FIG. 2, a portion of the hydraulic control system 100 is illustrated. The hydraulic control system 100 generally includes a plurality of interconnected or hydraulically communicating subsystems including a pressure regulator subsystem 106, an actuator feed subsystem 108, and an electronic transmission range selection (ETRS) control subsystem 110. The hydraulic control system 100 may also include various other subsystems or modules, such as a clutch control subsystem, a lubrication subsystem, a torque converter clutch subsystem, and/or a cooling subsystem, without departing from the scope of the present invention.

The pressure regulator subsystem 106 is operable to provide and regulate pressurized hydraulic fluid, such as transmission oil, throughout the hydraulic control system 100. The pressure regulator subsystem 106 draws hydraulic fluid from the sump 102. The sump 102 is a tank or reservoir preferably disposed at the bottom of the transmission housing 18 to which the hydraulic fluid returns and collects from various components and regions of the transmission. The hydraulic fluid is forced from the sump 102 and communicated throughout the hydraulic control system 100 via the pump 104. The pump 104 may be, for example, a gear pump, a vane pump, a gerotor pump, or any other positive displacement pump. The pressure regulator subsystem 106 may also include an alternate source of hydraulic fluid that includes an auxiliary pump (not shown) preferably driven by an electric engine, battery, or other prime mover (not shown), or an accumulator. The hydraulic fluid from the pump 104 is controlled by a pressure regulator valve 112. The pressure regulator valve 112 regulates the pressure of the hydraulic fluid from the pump 104 and feeds pressurized hydraulic fluid at line pressure to a main supply line 114. The main supply line 114 may include other branches and feed other subsystems, including the actuator feed subsystem 108, without departing from the scope of the present invention. The pressure regulator subsystem 106 may also include various other valves and solenoids without departing from the scope of the present invention.

The actuator feed subsystem 106 provides pressurized hydraulic fluid to the various solenoids or actuators throughout the hydraulic control system 100. The actuator feed subsystem 106 includes a valve 115 for regulating pressurized hydraulic fluid from the pressure regulator subsystem 106.

The ETRS control subsystem 110 converts electronic input for a requested range selection (Drive, Reverse, Park) into hydraulic and mechanical commands. The hydraulic commands use line pressure hydraulic fluid from the pressure regulator subsystem 106 via main supply line 114 to supply hydraulic fluid to a park servo mechanism 116. The mechanical commands include engaging and disengaging a park mechanism 117. The park mechanism 117 may be a conventional park mechanism that limits rotation of the transmission output shaft 22 or any other type of vehicle motion arresting system. The ETRS control subsystem 110 includes an enablement valve assembly 118, a control valve assembly 120, a first control device 122, a second control device 124, and a park inhibit solenoid assembly 126.

The enablement valve assembly 118 includes ports 118A-D, numbered consecutively from left to right in FIG. 2. Port 118A is connected to (in communication with) the first control device 122 via a fluid line 130. Port 118B is an exhaust port that communicates with the sump 102 or an exhaust backfill circuit (not shown). Port 118C is connected to the control valve assembly 120 via a control valve feed line 132. Port 118D is connected to the main supply line 114.

The enablement valve assembly 118 further includes a spool 140 slidably disposed within a bore 142 formed in the valve body 101. The spool 140 is moveable between a disable position (shown in FIG. 2) and an enable position (where the spool 140 is moved to the right in FIG. 2). A biasing member 144, such as a coiled spring, biases the spool 140 to the disable position. In the disable position, shown in FIG. 2, fluid port 118C exhausts through exhaust port 118B and fluid port 118D is closed by the spool 140. In the enable position, fluid port 118D communicates with fluid port 118C and fluid port 118B is closed by the spool 140.

The control valve assembly 120 includes ports 120A-F, numbered consecutively from left to right in FIG. 2. Port 120A is connected to (in communication with) the second control device 124 via a fluid line 146. Port 120B is connected to the enablement valve assembly 118 via a first branch 132A of the control valve feed line 132. Port 120C is connected to the park servo 116 via a park feed line 148. Port 120D is an exhaust port that communicates with the sump 102 or an exhaust backfill circuit (not shown). Port 120E is connected to the park servo 116 via an out-of-park feed line 150. Port 120F is connected to the enablement valve assembly 118 via the control valve feed line 132.

The control valve assembly 120 further includes a main spool 152 slidably disposed within a bore 154 formed in the valve body 101. The main spool 152 is moveable between a park position (shown in FIG. 2) and an out-of-park position (where the main spool 152 is moved to the right in FIG. 2). A biasing member 156, such as a coiled spring, biases the main spool 152 to the park position. In the park position, shown in FIG. 2, fluid port 120E exhausts through exhaust port 120D, fluid port 120F is closed by the main spool 152, and fluid port 120B communicates with fluid port 120C. In the out-of-park position, fluid port 120E communicates with fluid port 120F, fluid port 120B is closed by the main spool 152, and fluid port 120C exhausts through exhaust port 120D. A spool valve position sensor 159 is disposed proximate the main spool 152 and is operable to detect the position of the main spool 152. In the example provided, the spool valve position sensor 159 is illustrated as a hall-effect sensor having a sensor connected to the valve body 101 and a magnet connected to the main spool 152, though it should be appreciated that other types of sensors may be used without departing from the scope of the present invention. The spool valve position sensor 159 communicates with the transmission control module 36 and is used in diagnostics.

The park servo assembly 116 includes ports 116A and 116B each located on either side of a piston 160. Port 116A communicates with the out-of-park fluid line 150. Port 116B communicates with the park fluid line 148. The piston 160 is mechanically coupled to the park system 117. The piston 160 is moveable between a park position (where the piston 160 is moved to the right in FIG. 2) and an out-of-park position (shown in FIG. 2). A biasing member 162, such as a spring, biases the piston 160 to the park position. In the park position, the piston 160 engages the park assembly 117 placing the motor vehicle 5 in a park mode of operation where the transmission output shaft 22 is mechanically locked from rotation. Hydraulic fluid supplied to fluid port 116A moves the piston 160 against the force of the biasing member 162 to move the piston 160 to the out-of-park position. Hydraulic fluid is supplied to the fluid port 116B to move the piston 160 to the park position. A park servo position sensor 163 is disposed proximate a stem 165 attached to the piston 160 and is operable to detect the position of the main spool 152. In the example provided, the park servo position sensor 163 is illustrated as a hall effect sensor having a sensor connected to the valve body 101 or other housing member and a magnet connected to the stem 165, though it should be appreciated that other types of sensors may be used without departing from the scope of the present invention. The park servo position sensor 163 communicates with the transmission control module 36 and is used in diagnostics.

The first control device 122 is supplied pressurized hydraulic fluid from the feed actuator subsystem 106 via an actuator feed line 164. The first control device 122 is preferably an on/off solenoid, but may be a variable pressure solenoid, and is preferably a normally low solenoid that selectively allows hydraulic fluid flow from the actuator feed line 164 to the fluid line 130. The first control device 122 is in electrical communication with the transmission control module 36.

The second control device 124 is supplied pressurized hydraulic fluid from the feed actuator subsystem 106 via the actuator feed line 164. The second control device 124 is preferably an on/off solenoid, but may be a variable pressure solenoid, and is preferably a normally low (i.e., no current means low or zero pressure from the solenoid) solenoid that selectively allows hydraulic fluid flow from the actuator feed line 164 to the fluid line 146. The second control device 124 is in electrical communication with the transmission control module 36.

The park inhibit solenoid 126 is connected to the park servo assembly 116. When activated, the park inhibit solenoid 126 mechanically engages the piston 160 to keep the piston 160 in the out-of-park position. In one example of the present invention, the park inhibit solenoid 126 is in electrical communication with the transmission control module 36.

The transmission control module 36 commands the ETRS subsystem 110 to enter the out-of-park mode of operation from the park mode of operation upon receipt of an electrical signal from a range selector (not shown) in the motor vehicle 5. To transition to the out-of-park mode of operation, the transmission control module 36 commands the first control device 122 and the second control device 124 to open. Hydraulic fluid communicates from the first control device 122 through fluid line 130 and port 118A to contact an end of the spool 140. The spool 140 moves to the enable position against the force of the biasing member 144. Hydraulic fluid also communicates from the second control device 124 through fluid line 146 and port 120A to contact an end of the main spool 152. The main spool 152 moves to the out-of-park position against the force of the biasing member 156. Hydraulic fluid then communicates from the main supply line 114 through ports 118D and 118C of the enablement valve assembly 118, through the control valve feed line 132, through ports 120F and 120E of the control valve assembly 120, and through the out-of-park feed line 150 into the park servo assembly 116 via port 116A. The hydraulic fluid contacts the piston 160 and moves the piston 160 against the force of the biasing member 162 to the out-of-park position. The park inhibit solenoid 126 is preferably then engaged to keep the piston 160 in the out-of-park position. Closing the second control device 124 moves the main spool 152 to the park position, and hydraulic fluid communicates from branch 132A of the control valve feed line 132 through ports 120B and 120C to the park feed line 148 and into the park servo assembly 116 via port 116B. The hydraulic fluid contacts the piston 160 and moves the piston 160 with the force of the biasing member 162 to the out-of-park position when the park inhibit solenoid 126 is disengaged from the piston 160.

Figure 3:
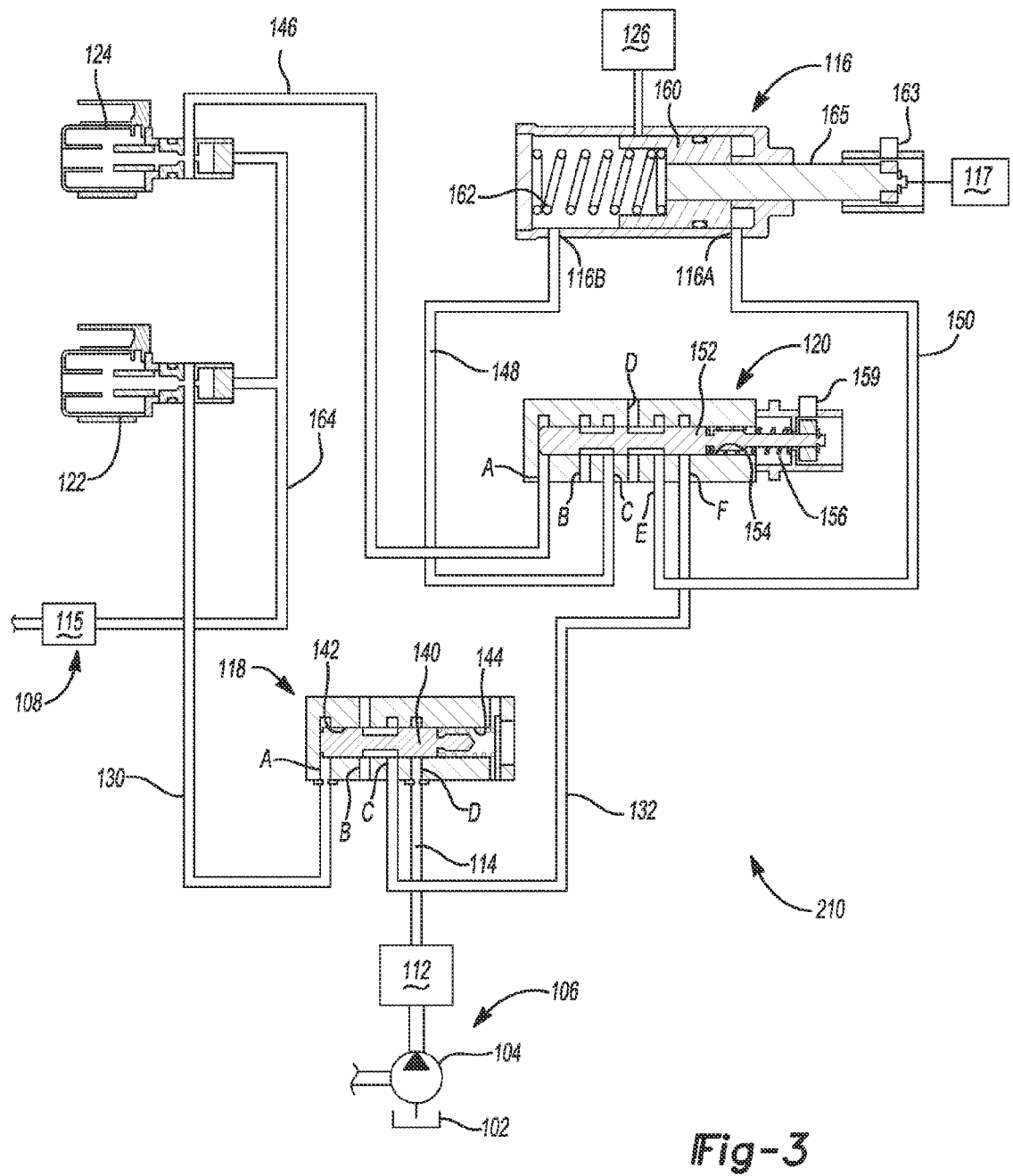
FIG. 3 is a diagram of another example of a portion of a hydraulic control system according to the principles of the present invention.

Turning to FIG. 3, another example of a hydraulic control system is illustrated having an ETRS subsystem 210. The ETRS subsystem 210 has similar components as the ETRS subsystem 110 shown in FIG. 2 and therefore like components are indicated by like reference numbers. However, in the ETRS subsystem 210, the first branch 132A of the control valve feed line 132 is removed and port 120B of the control valve assembly 120 is an exhaust port. Therefore, the park servo assembly 116 does not receive a park oil or hydraulic fluid feed from the control valve assembly 120. Instead the piston 160 moves to the park position under the force of the biasing member 162 only. In addition, the park inhibit solenoid 126 is electrically controlled by a controller other than the transmission control module 36. The park inhibit solenoid 126 may be electrically controlled by the engine control module 38, the electronic brake control module 40, the body control module 42, or the dedicated park inhibit solenoid module 44.

In another example, the park inhibit solenoid 126 is electrically controlled by the transmission control module 36 and the first and second control devices 122, 124 are each normally high solenoids (i.e., no current means high or maximum pressure from the solenoid). Therefore, in the event of a failure of the transmission control module 36, the control devices 122, 124 remain open and the ETRS subsystem 210 remains in the out-of-park mode. To return to park, the pump 104 may be shut off, thus allowing the biasing member 162 to move the piston 160 to engage park.

Figure 4:
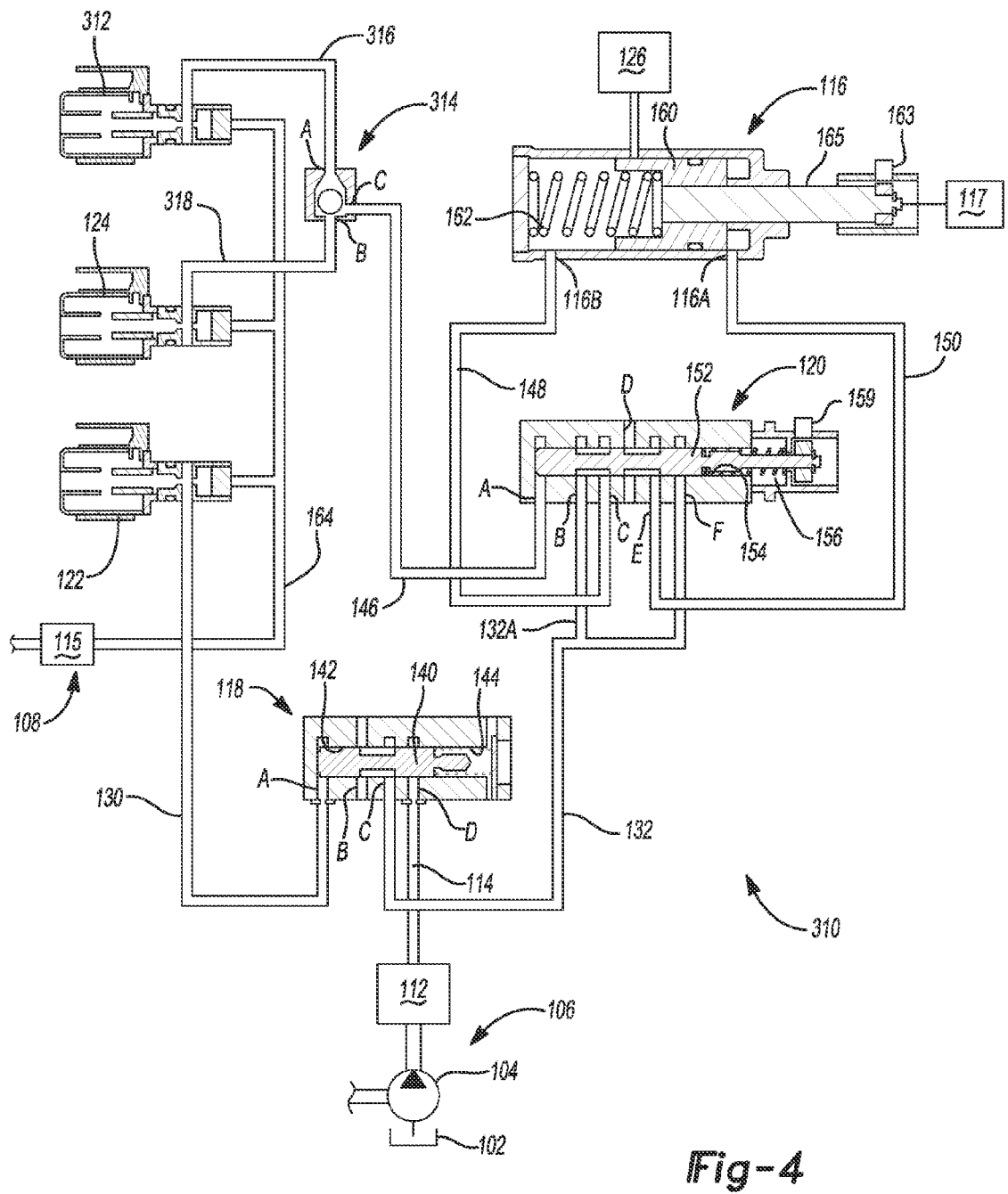
FIG. 4 is a diagram of yet another example of a portion of a hydraulic control system according to the principles of the present invention.

Turning to FIG. 4, another example of a hydraulic control system is illustrated having an ETRS subsystem 310. The ETRS subsystem 310 has similar components as the ETRS subsystem 110 shown in FIG. 2 and therefore like components are indicated by like reference numbers. However, the ETRS subsystem 310 includes a third control device 312 connected to the fluid line 146 through a ball check valve 314.

The third control device 312 is supplied pressurized hydraulic fluid from the feed actuator subsystem 106 via the actuator feed line 164. The third control device 312 is preferably an on/off solenoid, but may be a variable pressure solenoid, and is preferably a normally low solenoid that selectively allows hydraulic fluid flow from the actuator feed line 164 to a fluid line 316. The third control device 312 is in electrical communication with the transmission control module 36.

The ball check valve 314 is disposed between the second and third control devices 124, 312 and the control valve assembly 120. The ball check valve 314 includes a first inlet 314A, and second inlet 314B, and an outlet 314C. The ball check valve 314 allows fluid communication from whichever of the inlets 314A, 314B is providing the higher pressure to the outlet 314C. The first inlet 314A is connected to the third control device 312 via the fluid line 316. The second inlet 314B is connected to the second control device 124 via a fluid line 318. The outlet 314C is connected to the control valve assembly 116 via the fluid line 146. The third control device 312 acts as a backup to the second control device 124 to move the control valve assembly 120 if the second control device 124 fails.

In another example, the first and second control devices 122, 124 are each normally high solenoids (i.e., no current means high or maximum pressure from the solenoid). Therefore, in the event of a failure of the transmission control module 36, the control devices 122, 124 remain open and the ETRS subsystem 310 remains in the out-of-park mode. To return to park, the pump 104 may be shut off, thus allowing the biasing member 162 to move the piston 160 to engage park.

Figure 5:
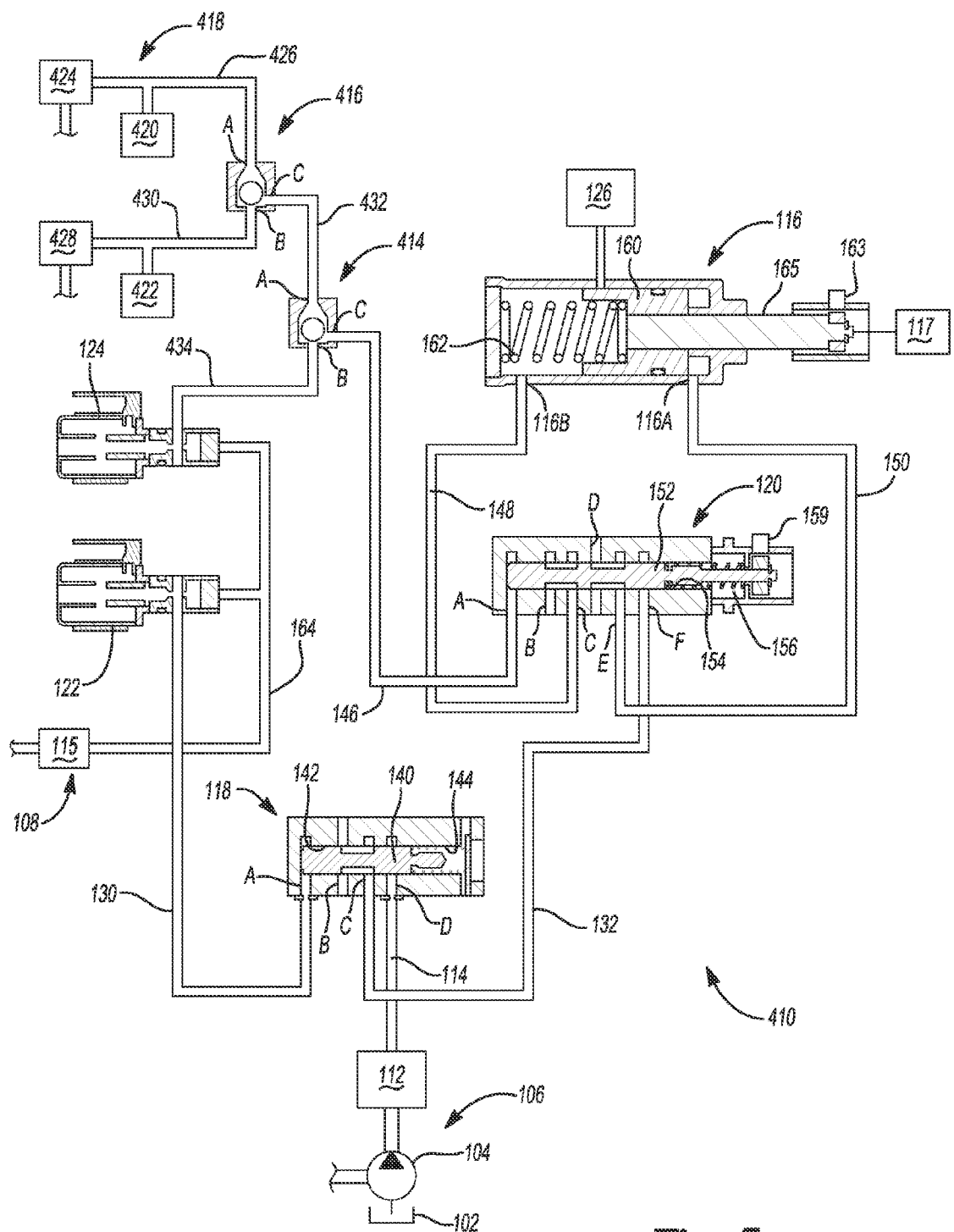
FIG. 5 is a diagram of yet another example of a portion of a hydraulic control system according to the principles of the present invention.

With reference to FIG. 5, another example of a hydraulic control system is illustrated having an ETRS subsystem 410. The ETRS subsystem 410 has similar components as the ETRS subsystem 110 shown in FIG. 2 and therefore like components are indicated by like reference numbers. However, the ETRS subsystem 410 includes a first ball check valve 414 connected with a second ball check valve 416. The second ball check valve 416 communicates with a clutch control subsystem 418 in the hydraulic control system 100. The clutch control subsystem 418 includes a plurality of actuators and control devices for selectively engaging the plurality of clutches/brakes 34.

For example, the clutch control subsystem 418 includes, at least, a first actuator 420 for actuating a first clutch or brake and a second actuator 422 for actuating a second clutch or brake. A first actuator solenoid 424 selectively communicates pressurized hydraulic fluid to the first actuator 420 through a fluid line 426. A second actuator solenoid 428 selectively communicates pressurized hydraulic fluid to the second actuator 422 through a fluid line 430.

The first ball check valve 414 is disposed between the clutch control subsystem 418 and the second ball check valve 416 and the control valve assembly 120. The ball check valve 414 includes a first inlet 414A, and second inlet 414B, and an outlet 414C. The ball check valve 414 allows fluid communication from whichever of the inlets 414A, 414B is providing the higher pressure to the outlet 414C. The first inlet 414A is connected to the second ball check valve 416 via a fluid line 432. The second inlet 414B is connected to the second control device 124 via a fluid line 434. The outlet 414C is connected to the control valve assembly 116 via the fluid line 146.

The second ball check valve 416 is disposed between the clutch control subsystem 418 and the second ball check valve 416 and the control valve assembly 120. The ball check valve 416 includes a first inlet 416A, and second inlet 416B, and an outlet 416C. The ball check valve 416 allows fluid communication from whichever of the inlets 416A, 416B is providing the higher pressure to the outlet 416C. The first inlet 416A is connected to the first actuator solenoid 424 via the fluid line 426. The second inlet 416B is connected to the second actuator solenoid 428 via the fluid line 430. The outlet 416C is connected to the first ball check valve 414 via the fluid line 432.

The clutch actuator subsystem 418 acts as a backup to the second control device 124 to move the control valve assembly 120 if the second control device 124 fails. In addition, the park inhibit solenoid 126 is electrically controlled by a controller other than the transmission control module 36. The park inhibit solenoid 126 may be electrically controlled by the engine control module 38, the electronic brake control module 40, the body control module 42, or a dedicated park inhibit solenoid module 44.

In addition, the park inhibit solenoid 126 is electrically controlled by a controller other than the transmission control module 36. The park inhibit solenoid 126 may be electrically controlled by the engine control module 38, the electronic brake control module 40, the body control module 42, or the dedicated park inhibit solenoid module 44. In a preferred embodiment, the park inhibit solenoid module 44 is powered by a separate, dedicated power source, such as a battery 440. The park inhibit solenoid module 44 communicates with a vehicle speed sensor 442 (see FIG. 1). The vehicle speed sensor 442 may sense a speed of the transmission output shaft 22, or wheel axles, or any other component indicative of a speed of the motor vehicle 5. The park inhibit solenoid module 44 commands the solenoid assembly 126 to keep the piston 160 in the out-of-park mode when the sensed vehicle speed is not zero.

The description of the invention is merely exemplary in nature and variations that do not depart from the general essence of the invention are intended to be within the scope of the invention. Such variations are not to be regarded as a departure from the spirit and scope of the invention.

The following is claimed:

1. A hydraulic control system for a transmission having a park mechanism, the hydraulic control system comprising:
    a source of pressurized hydraulic fluid;
    a park servo connected to the park mechanism, the park servo having a park side, an out-of-park side, and a biasing member disposed on the park side;
    a first valve assembly having a first inlet port in fluid communication with the source of pressurized hydraulic fluid, having a first outlet port, and having a first valve for selectively allowing fluid communication between the first inlet port and the first outlet port;
    a second valve assembly having a second inlet port in direct fluid communication downstream of the first valve assembly, having a second outlet port in direct fluid communication with the out-of-park side of the park servo, and having a second valve moveable between an out-of-park position and a park position, wherein the second valve allows fluid communication from the second inlet port to the second outlet port when in the out-of-park position and prohibits fluid communication from the second inlet port to the second outlet port when in the park position.

2. The hydraulic control system of claim 1 further comprising a first solenoid in selective fluid communication with the first valve assembly to selectively move the first valve, and a second solenoid in selective fluid communication with the second valve assembly to selectively move the second valve to the out-of-park position.

3. The hydraulic control system of claim 2 wherein the first solenoid and the second solenoid are normally low.

4. The hydraulic control system of claim 2 wherein the first solenoid and the second solenoid are normally high.

5. The hydraulic control system of claim 2 further comprising a park inhibit solenoid that selectively mechanically engages the park servo.

6. The hydraulic control system of claim 5 further comprising a transmission control module in electronic communication with the first and second solenoids.

7. The hydraulic control system of claim 6 wherein the park inhibit solenoid is not in electronic communication with the transmission control module.

8. The hydraulic control system of claim 2 wherein the second valve assembly further includes a third inlet port in fluid communication with the first outlet port of the first valve assembly and a third outlet port in fluid communication with the park side of the park servo, wherein the second valve prohibits fluid communication between the third inlet port and the third outlet port when in the out-of-park position and allows fluid communication between the third inlet port and the third outlet port when in the park position.

9. The hydraulic control system of claim 8 further comprising a third solenoid and a first check valve disposed between the third solenoid, the second solenoid, and the second valve assembly.

10. The hydraulic control system of claim 9 wherein the first solenoid, the second solenoid, and the third solenoid are normally low.

11. The hydraulic control system of claim 9 wherein the first solenoid and the second solenoid are normally high and the third solenoid is normally low.

\* \* \* \* \*